United States Patent [19]

Reynolds et al.

[11] 4,316,637
[45] Feb. 23, 1982

[54] MULTI-STYLED ALUMINUM WHEEL

[75] Inventors: J. Louis Reynolds; Paul R. O'Brien, both of Richmond, Va.

[73] Assignee: Reynolds Metals Company, Richmond, Va.

[21] Appl. No.: 94,738

[22] Filed: Nov. 15, 1979

Related U.S. Application Data

[63] Continuation-in-part of Ser. No. 931,171, Aug. 4, 1978, abandoned.

[51] Int. Cl.³ .............................................. B60B 13/00
[52] U.S. Cl. ............................ 301/37 R; 301/63 DD; 29/159 A
[58] Field of Search ............ 301/37 R, 63 R, 63 DD, 301/63 DT, 65, 37 TP, 37 PB; 29/159.01, 159 A, 159.1; 295/8, 21-23, 24, 28; 152/381.3-381.6, 378

[56] References Cited

U.S. PATENT DOCUMENTS

| | | | |
|---|---|---|---|
| 446,571 | 2/1891 | Player | 295/22 |
| 465,096 | 12/1891 | Josef | 295/22 |
| 1,989,188 | 1/1935 | Frank | 152/381.3 |
| 2,068,947 | 1/1937 | Frank | 29/159.1 |
| 2,127,598 | 8/1938 | Horn et al. | 301/37 PB |

FOREIGN PATENT DOCUMENTS 447026  5/1936  United Kingdom .................. 295/8

*Primary Examiner*—H. Grant Skaggs
*Attorney, Agent, or Firm*—Lyne, Girard and McDonald

[57] ABSTRACT

A composite aluminum wheel for use with an inflatable tire on vehicles such as automobiles, vans, trucks and the like is disclosed in which a cast aluminum insert is permanently and integrally mounted within a base aluminum wheel to form a composite structure. The cast aluminum insert is mounted into the aluminum base wheel so as to prohibit axial movement thereof by means such as swage-forging or the like. The cast aluminum insert allows almost unlimited styling variations for the face of the composite wheel and adds structural strength to the aluminum base wheel such that weight reduction from the rim area of the aluminum base wheel can be accomplished.

9 Claims, 4 Drawing Figures

MULTI-STYLED ALUMINUM WHEEL

CROSS-REFERENCE TO RELATED APPLICATIONS

This application is a continuation-in-part of U.S. Application Ser. No. 931,171, filed Aug. 4, 1978, now abandoned.

BACKGROUND OF THE INVENTION

This invention relates to vehicular wheels upon which inflatable tires may be mounted. Such wheels are commonly employed in the transportation industry in automobiles, vans, trucks and the like.

In the past, wheels employed for transportation uses have been formed of wrought steel. While such steel wheels operate satisfactorily, with the ever-increasing need for fuel economy, both for economic and conservation purposes, several attempts have been made to replace these steel wheels with wheels formed of aluminum and its alloys. When employing aluminum vehicular wheels, significant weight reduction can be realized over similar wheels formed of steel.

Two choices can be made for employing aluminum wheels to replace steel wheels. The aluminum wheels may be either metal worked or cast. The term "metal worked" is meant to include such operations as extrusion, forging, stamping, coining, swaging, embossing and the like.

Cast aluminum wheels have an advantage in that the wheels may be formed with intricate stylized face surfaces such that when employing a cast aluminum wheel no added-on hubcap or other decorative feature is required for aesthetic purposes. This feature is desirable, since added-on hubcaps may be lost or stolen. However, due to the porosity, dynamic fatigue life, yield strength and elongation properties of cast aluminum, wheels formed from cast aluminum, while still significantly lighter than steel wheels, are not as light as could be hoped for by replacing steel with aluminum.

Metal worked aluminum wheels, on the other hand, may be formed significantly lighter than even cast aluminum wheels. This is due to the superior physical properties for structures formed of metal worked aluminum over those formed of cast aluminum. For example, an extruded or forged 6061-T6 aluminum alloy has a yield strength of approximately 38,000 PSI (185,500 kilograms per square meter) while a cast aluminum alloy No. 356 has a yield strength of approximately 16,000 to 18,000 PSI (78,100 to 87,900 kilograms per square meter). The elongation of the extruded or forged alloy is a minimum 14% while the cast alloy has an elongation of approximately 2-7%. Thus, a 14 inch by 5.5 inch (35.6 by 12.9 centimeter) extruded or forged aluminum wheel of 6061-T6 alloy weighs approximately 11.25 pounds (5.10 kilograms) while a cast aluminum wheel formed of 356 alloy and of equivalent strength weighs approximately 16 pounds (7.26 kilograms). Thus, the extruded or forged aluminum wheel is approximately 30% lighter than the equivalent cast aluminum wheel.

Metal worked aluminum wheels, however, have a disadvantage from the stylist point of view. Similar to forged steel wheels, metal worked aluminum wheels cannot be formed with the intricate stylized faces which can readily be formed in cast aluminum wheels. Thus, similar to forged steel wheels, metal worked aluminum wheels have been designed in the past to accept an added-on hubcap or other stylizing face which, as previously mentioned, is subject to being lost or stolen.

It is desirable, therefore, to form an integral aluminum wheel having the strength properties of a metal worked aluminum wheel and the stylizing advantages of a cast aluminum wheel, and while taking full advantage of the weight reduction properties of aluminum over steel.

THE PRESENT INVENTION

By means of the present invention, such a composite aluminum wheel can be produced. The composite aluminum wheel of the present invention comprises an aluminum base wheel capable of accepting an inflatable tire mounted thereon and having a cast aluminum insert permanently and integrally mounted into the base wheel so as to form a composite integral structure, with the cast aluminum insert being incapable of axial movement after being mounted into the aluminum base wheel. The cast aluminum insert not only adds styling to the face of the composite wheel, but also adds structural strength to the composite wheel, thus allowing significant weight reduction from the rim of the aluminum base wheel.

BRIEF DESCRIPTION OF THE DRAWINGS

The integral composite aluminum wheel structure of the present invention will be more fully described with reference to the drawings in which.

DETAILED DESCRIPTION OF THE PREFERRED EMBODIMENTS

Figure 1:
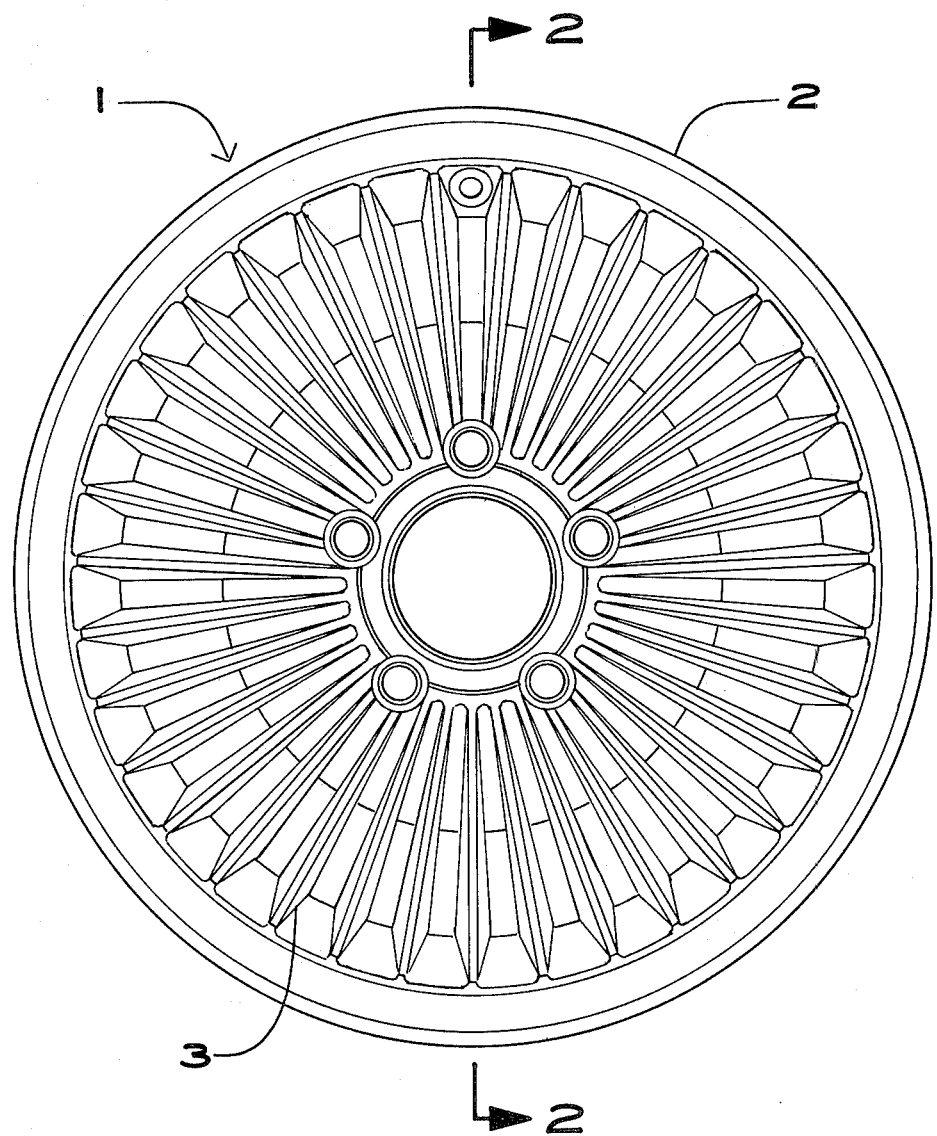
FIG. 1 is a front elevational view of the face of a typical integral composite aluminum wheel formed according to the present invention.

Turning to the FIGURES, FIG. 1 illustrates the front face of a typical composite aluminum wheel formed according to the present invention. The composite wheel 1 comprises an aluminum base wheel 2 and a cast aluminum insert 3 permanently mounted therein to form an integral composite structure. Preferably, the aluminum base wheel 2 is formed by forging or extrusion. However, the aluminum base wheel 2 may be formed by any of the metal working operations previously mentioned. The face design as shown in FIG. 1 is only one of innumerable varied face structures which may be produced by the practice of the instant invention. In fact, one of the major features of the composite aluminum wheel of the present invention is the fact that the cast aluminum insert 3 may be styled to produce almost any face design desired by the stylist while using the same aluminum base wheel. Of course, various aluminum base wheel structures may also be employed, as required by different vehicles or for other structural reasons. Thus, the specific facial design illustrated in FIG. 1 comprises no part of the instant invention.

Figure 2:
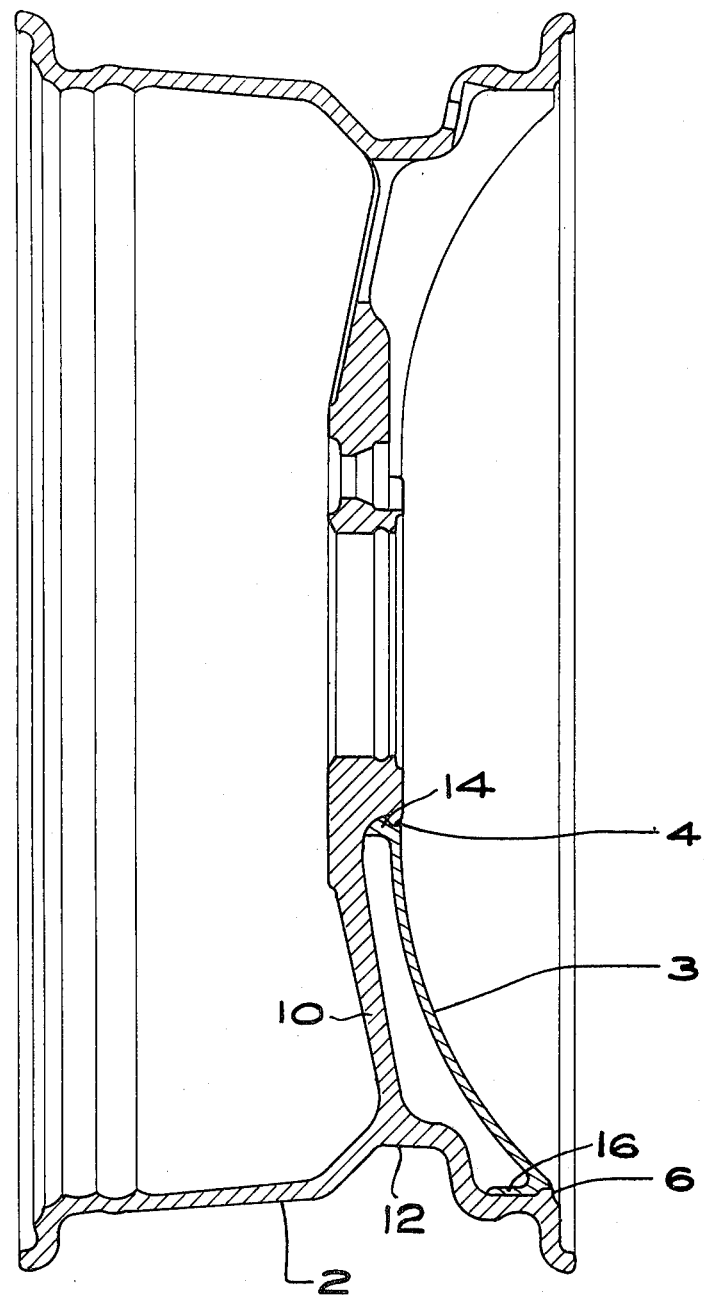
FIG. 2 is a cross-sectional view taken through line 2-2 of FIG. 1, illustrating the integral composite wheel structure of the present invention.
Figure 3:
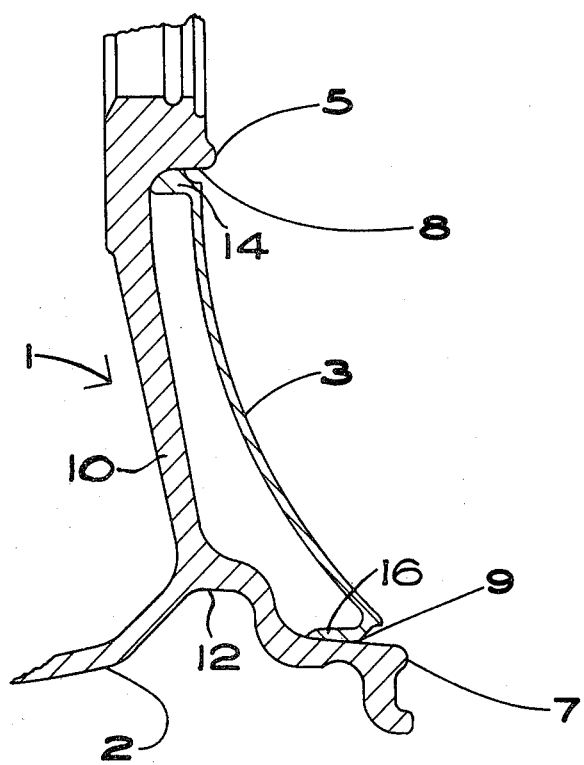
FIG. 3 is an expanded view of a portion of FIG. 2 illustrating the positioning of the aluminum base wheel and the cast aluminum insert prior to their being united to form the integral composite structure.
Figure 4:
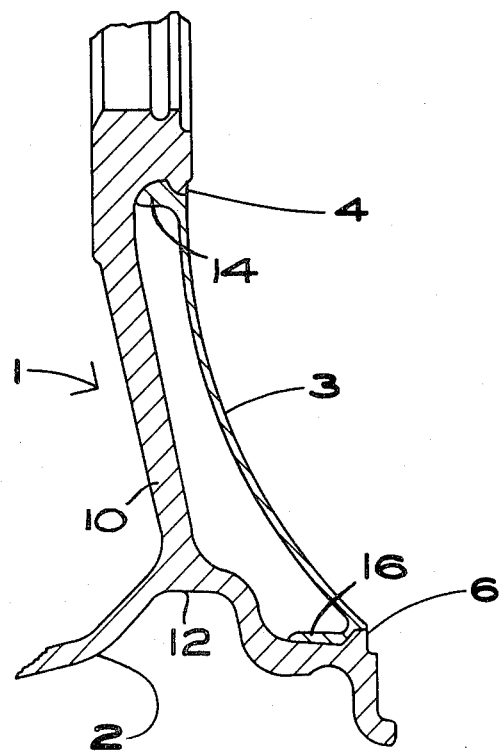
FIG. 4 illustrates the same expanded portion of FIG. 2 illustrating the integral locking of the cast aluminum insert into the aluminum base wheel to form the composite structure.

FIGS. 2 through 4 illustrate the integration of the aluminum base wheel 2 and the cast aluminum insert 3 to form the integral composite wheel structure 1. FIG. 2 is a cross-sectional view of the composite aluminum wheel 1 as illustrated in FIG. 1. The aluminum base wheel 2 includes a rim portion, including a wheel well 12, and a hub or web portion 10 which is positioned adjacent the wheel well 12.

As can be seen in FIG. 2, the cast aluminum insert 3 is locked into the aluminum base wheel 2 by means of overlap locking means 4 and 6 formed as portions of the aluminum base wheel 2 such that the aluminum base wheel 2 at least partially surrounds the lips of the cast aluminum insert 3 and locks the cast aluminum insert 3 into place. The cast aluminum insert 3 includes a pair of flanges 14 and 16 which, when fastened into place by the locking means 4 and 6 into the base wheel 2, locks the cast aluminum insert 3 in place to prohibit axial movement thereof.

FIG. 3 illustrates the positioning of the cast aluminum insert 3 and the aluminum base wheel 2 prior to the locking of the cast aluminum insert 3 in place. The aluminum base wheel 2 is formed with nodules or beads 5 and 7 on the surface of the web or hub 10. The nodules or beads 5 and 7 may be a plurality of spaced nodules around the aluminum base wheel 2. Alternatively, the locking means may be circular beads running around the aluminum base wheel 2, either continuously or as discontinuous spaced members. Also, the aluminum base wheel 2 is formed having surfaces 8 and 9 which permit the cast aluminum insert 3 to be slipped into the aluminum base wheel 2, with the flanges 14 and 16 on the cast aluminum insert 3 being constructed and arranged to cooperate with the surfaces 8 and 9 and the nodules or beads 5 and 7 to thereby lock the cast aluminum insert 3 in place to prohibit axial movement thereof. At this point, the integral composite wheel structure 1 is ready to be formed.

As can be best seen in FIG. 4, the nodules or beads 5 and 7 on aluminum base wheel 2 have been deformed to form locks 4 and 6 which surround the flanges 14 and 16 of the cast aluminum insert 3 and hold the cast aluminum insert 3 into the aluminum base wheel 2 without axial movement of the cast aluminum insert 3 to form the integral composite wheel structure 1. This locking operation can be formed in several manners. The preferred method of performing this operation is by swage-forging, as is known in the art. In such an operation, the aluminum base wheel 2 and cast aluminum insert 3 are firmly held in place, such as in a mold, while a die strikes the face of the aluminum base wheel 2 and deforms the nodules or beads 5 and 7 into the locking shapes 4 and 6 to firmly hold the cast aluminum insert 3 in place and produce the integral composite wheel structure 1. However, this is not the only way in which the structure 1 can be formed. Other aluminum working operations, such as roller curl forming or spinning, may also be employed. The manner in which the locking operation takes place will have no effect on the final structure.

The aluminum base wheel 2 can be formed by an extrusion operation in the manner of U.S. Pat. No. 3,263,315, which is assigned to the assignee of the present invention. A typical alloy for aluminum wheels which may be employed to form the aluminum base wheel 2 in the present invention is alloy 6061-T6. Of course, other similar alloys may be employed. Similarly, any of the previously mentioned metal working operations may be employed to form the aluminum base wheel 2.

The cast aluminum insert 3 can be formed of casting alloy 356, which is typically employed for cast automotive wheels, or other similar casting alloys. The cast aluminum insert 3 may be formed by sand casting, permanent mold casting, low pressure die casting or high pressure die casting. Preferably, the cast aluminum insert 3 is formed by either high or low pressure die casting.

When the cast aluminum insert 3 has been locked into place, the result is the unitary composite wheel structure 1. Because of this integral structure 1, not only does the cast aluminum insert 3 add decorative appearance to the composite wheel 1, the cast aluminum insert 3 adds structural strength to the composite wheel 1.

In designing aluminum wheels, up to 70% of the weight of the wheel is in the rim area. When employing the composite wheel 1 of the present invention, the structural cast aluminum insert 3 shifts some of the inertial and other stress forces, which in the past have been carried mostly by the rim, to the central hub 10 of the composite wheel 1. This allows the rim area to be designed lighter than previously required. Weight reductions in the rim area of up to 20% over previous aluminum wheels may be realized by employing the composite wheel structure 1 of the present invention.

An additional function performed by the cast aluminum insert 3 is a heat transfer function. During travel of a vehicle, great heat buildup in the tire results. Because of aluminum's high thermal conductivity, much of the heat in this tire is transferred to the wheel. In past aluminum wheels, most of this heat was retained in the rim area and, with continual heat buildup, could cause tire failure. However, when employing the composite wheel structure 1 of the present invention, the cast aluminum insert 3 acts as an additional heat exchanger and transports a portion of the heat in the rim throughout the cast aluminum insert 3 and thus to the air, which reduces the temperature of the rim and helps prevent tire failure.

Thus, it is clear that the composite wheel of the present invention is improved both from the aspects of styling and structure.

While present preferred embodiments of the invention have been illustrated and described, it will be understood that the invention may be otherwise variously embodied and practiced within the scope of the following claims.

We claim:

1. A composite automotive wheel upon which an inflatable tire may be mounted, comprising a metal worked aluminum base wheel and a cast aluminum structural insert, said metal worked aluminum base wheel comprising a rim having a wheel well and a hub positioned adjacent said wheel well, said cast aluminum structural insert being permanently locked within said metal worked aluminum base wheel to prohibit axial movement of said cast aluminum structural insert by means of a pair of flanges located on said cast aluminum structural insert and locking beads forming a portion of said metal worked aluminum base wheel, said beads being deformed about said flanges to lock said cast aluminum structural insert into said metal worked aluminum base wheel, said cast aluminum structural insert providing additional structural strength to said metal worked aluminum base wheel and said cast aluminum structural insert providing the major portion of the outside decorative face of composite wheel.

2. The wheel of claim 1 wherein said metal worked aluminum base wheel is formed of aluminum alloy No. 6061-T6.

3. The wheel of claim 1 wherein said cast aluminum structural insert is formed of aluminum alloy No. 356.

4. The wheel of claim 1 wherein said cast aluminum structural insert is locked into said metal worked aluminum base wheel by means of swage-forging said beads about said flanges.

5. The wheel of claim 1 wherein said cast aluminum structural insert is locked into said metal worked aluminum base wheel by means of roller curl forming said beads about said flanges.

6. The wheel of claim 1 wherein said cast aluminum structural insert is formed by low pressure die casting.

7. The wheel of claim 1 wherein said cast aluminum structural insert is formed by high pressure die casting.

8. The wheel of claim 1 wherein said metal worked aluminum base wheel is formed by forging.

9. The wheel of claim 1 wherein said metal worked aluminum base wheel is formed by extrusion.

* * * * *